Oct. 23, 1928.

R. POHL

DYNAMO ELECTRIC MACHINE

Filed Feb. 17, 1927

1,689,187

Inventor
Robert Pohl,
by
His Attorney.

Patented Oct. 23, 1928.

1,689,187

UNITED STATES PATENT OFFICE.

ROBERT POHL, OF BERLIN, GERMANY, ASSIGNOR TO GENERAL ELECTRIC COMPANY, A CORPORATION OF NEW YORK.

DYNAMO-ELECTRIC MACHINE.

Application filed February 17, 1927, Serial No. 169,049, and in Germany March 29, 1927.

My invention relates to dynamo-electric machines and has for its object the provision of a magnetic conducting path of low reluctance for the end stray field flux, so that the passage of this flux through massive parts thereof and the resulting eddy current losses will be avoided.

It has heretofore been the practice to clamp the stator laminations of a dynamo-electric machine by means of massive clamping members and clamping fingers which engage sides of the stator teeth. This construction involves the use of large unlaminated masses of iron in the path of the end stray field flux, which flux in a polyphase machine rotates synchronously with the rotor or in a single phase machine pulsates, and large eddy current losses result. These losses are avoided, according to my invention, by a construction in which there are no large unlaminated masses of iron in the path of the stray field flux, and by providing a magnetic path of low reluctance therefor.

Figure 1:
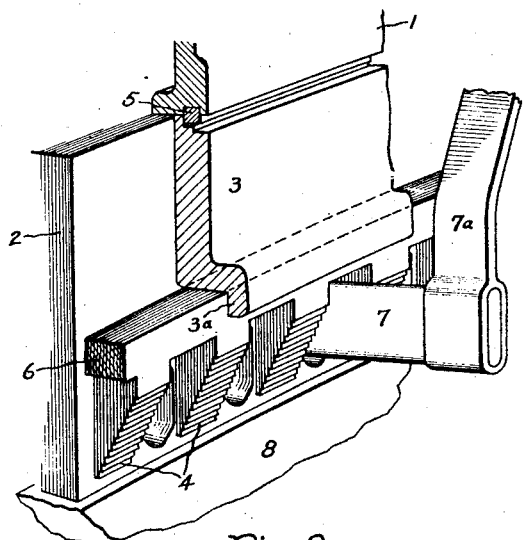
Figure 2:
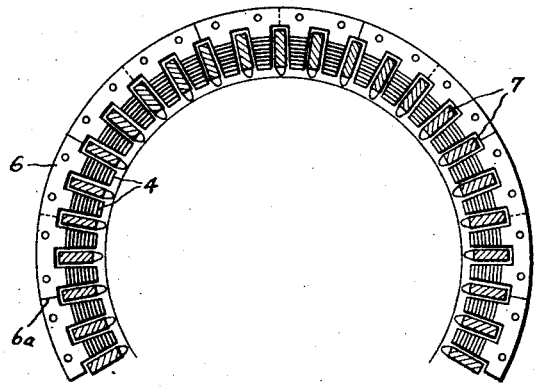
Figure 3:
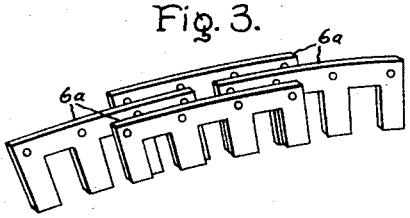

My invention will be more fully set forth in the following description referring to the accompanying drawing, in which Fig. 1 is a fragmentary sectional view of a stator of a dynamo-electric machine embodying my invention; Fig. 2 is a side elevation of part of the structure shown in Fig. 1; and Fig. 3 is a detailed perspective view of the arrangement of the toothed lamination sectors employed in forming an annulus.

In the drawing a frame 1 of a dynamo-electric machine supports the stator laminations 2 thereof, which are clamped in position by a clamping member 3 and laminated clamping fingers 4 projecting between the stator slots, the latter exerting the necessary pressure to properly align the inner periphery of the stator laminations adjacent the end thereof. The clamping member 3 is secured to the frame of the machine in any suitable manner, for example, by the use of a key 5, and is provided with an annular flange 3ª for engaging a group of laminations forming an annulus 6 made of a plurality of toothed lamination sectors 6ª overlapped, as shown in Fig. 3, to form a rigid construction. These toothed lamination sectors are arranged with edges at successively increasing distances from the inner periphery of the stator to form stepped clamping fingers steeply inclined relative to the axis of the stator, or the rotor which is coaxial therewith, and exposed to the stray field flux produced in the operation of the machine. This inclination should be substantial, and to obtain the best results this inclination should be at least 30 degrees to the axis of the rotor and preferably 45 degrees or more. When the clamping member 3 is secured to the frame 1 by means of the key 5, the annulus 6 will bear against the flange 3ª and on the face of the stator laminations 2 so that they will be firmly clamped in place. The laminated fingers 4, extending between the stator slots, being stepped, from cantilever leaf spring fingers which resiliently bear on the edges of the stator laminations. It will be understood that the inner face of the clamping member 3 and the inner face of the annulus 6 are in alignment so that the clamping of the stator laminations 2 will be uniform throughout. It may be found desirable to form the annulus 6 of a plurality of independent sectors so that it will conform more readily to any irregularity in the stator laminations, and in this case the sectors 6ª would be arranged in a series of stacks rather than overlapped, as shown in Fig. 3. The annulus 6 may be made of a plurality of annular laminations successively decreasing in diameter from the outer face thereof toward the side in contact with the stator, and the edges of the laminations may be beveled to form gradually tapering fingers instead of a series of steps. Conductors 7 extend through the slots of the stator laminations 2 and are connected together by end connections 7ª. A rotor 8 of any desired form is supported closely adjacent the stator.

In operation of the dynamo-electric machine a rotating or pulsating stray field is produced which enters the exposed edges of the group of laminations comprising the annulus 6 adjacent the end of the stator and passes radially and circumferentially therethrough. The path of this stray field flux is through laminations of small sectional area transverse to the flux path, and as massive parts of the machine in the path thereof are avoided, eddy current losses are minimized.

My invention substantially reduces eddy current losses due to end stray field flux in the operation of a dynamo-electric machine and I desire it to be understood that my invention is not limited to the particular arrangement shown and described, but I intend in the appended claims to cover all modifications which do not depart from the spirit and scope of my invention.

What I claim as new and desire to secure by Letters Patent of the United States, is:

1. In a dynamo-electric machine, a stator including laminations of magnetic material transversely aligned to form a surface adapted to substantially conform to a rotor, and a group of laminations adjacent the end of the stator having their edges presented toward the axis of the stator and at different distances from the axis of the stator in order to reduce eddy current losses due to end stray field flux.

2. In a dynamo-electric machine, a rotor, a stator including laminations forming a surface substantially conforming to the shape of the rotor, and a group of laminations of magnetic material adjacent the end of the stator in which the edges of the laminations are presented toward the rotor at successively increasing distances from the axis of the rotor, thereby exposing the laminations of the group to the end stray field flux in order to reduce eddy current losses therein.

3. In a dynamo-electric machine, a rotor, a stator including laminations of magnetic material forming a surface substantially conforming to the shape of the rotor, and laminations adjacent the end of the stator successively decreasing in diameter arranged with their edges presented toward the axis of the rotor, thereby forming a steep incline relative to the axis of said rotor in order to reduce losses due to the end stray field flux.

4. In a dynamo-electric machine, a rotor, a stator including laminations forming a surface substantially conforming to the shape of the rotor, and laminations of magnetic material adjacent the end of the stator arranged with their edges presented toward the axis of the rotor and successively decreasing in diameter so as to form an incline of at least 30 degrees relative to the axis of said rotor in order to reduce losses due to the end stray field flux.

5. In a dynamo-electric machine, a rotor and a stator including laminations that form a surface substantially conforming to the shape of the rotor, laminations of magnetic material adjacent the end of the stator successively decreasing in diameter in steps, thereby forming a substantial radially stepped incline relative to said rotor in order to reduce the losses due to the end stray field flux.

6. In a dynamo-electric machine, a stator, and a clamping member for the stator including laminated clamping fingers of magnetic material in which the laminations are at different distances from the axis of the stator.

7. In a dynamo-electric machine, a stator, and a clamping member for the stator including laminated clamping fingers of magnetic material in which edges of the laminations are arranged in steps.

8. In a dynamo-electric machine, a stator and a clamping member for the stator including laminated clamping fingers of magnetic material in which the edges of the laminations are arranged to form a steep incline relative to the sides of the stator laminations.

9. In a dynamo-electric machine, a stator, a clamping member for the stator having a flange at one side thereof, and toothed laminations of magnetic material between said flange and the stator having edges thereof arranged in steps forming clamping fingers for the stator.

10. In a dynamo-electric machine, a stator, a clamping member for the stator having a flange at one side thereof, and toothed laminations of magnetic material between said flange and the stator having the edges thereof arranged to form a series of steps at least 30 degrees relative to the axis of the stator, the teeth of said laminations forming clamping fingers for the stator.

11. In a dynamo-electric machine, a stator having slots therein, a clamping member for the stator having a flange on one side thereof, and laminated teeth of magnetic material between said flange and the stator of sufficient thickness to align the inside of said teeth with the inner face of the clamping cover, said teeth bearing on the stator between the slots thereof.

In witness whereof, I have hereunto set my hand this 28th day of January, 1927.

ROBERT POHL.

CERTIFICATE OF CORRECTION.

Patent No. 1,689,187. Granted October 23, 1928, to

ROBERT POHL.

It is hereby certified that error appears in the printed specification of the above numbered patent requiring correction as follows: Page 1, line 66, for the word "from" read "form"; and that the said Letters Patent should be read with this correction therein that the same may conform to the record of the case in the Patent Office.

Signed and sealed this 27th day of November, A. D. 1928.

(Seal)

M. J. Moore,
Acting Commissioner of Patents.